United States Patent [19]

Cimenti

[11] Patent Number: 5,753,276
[45] Date of Patent: May 19, 1998

[54] MACHINE FOR ROUNDING PIECES OF DOUGH

[76] Inventor: Antonio Cimenti, Località Fontane, 3-Polcenigo, Pordenone, Italy

[21] Appl. No.: 739,223

[22] Filed: Oct. 29, 1996

[30] Foreign Application Priority Data

Oct. 30, 1995 [IT] Italy .................. PN95A0055

[51] Int. Cl.$^6$ ...................................... A21C 3/00
[52] U.S. Cl. ............... 425/333; 264/15; 264/310; 425/363; 426/391; 426/512
[58] Field of Search ................. 425/240, 241, 425/332, 333, 363; 264/15, 310; 426/391, 446, 512

[56] References Cited

U.S. PATENT DOCUMENTS

| | | | |
|---|---|---|---|
| 986,413 | 3/1911 | Streich | 425/333 |
| 993,138 | 5/1911 | Aldred | 425/333 |
| 1,044,803 | 11/1912 | Moores | 425/333 |
| 1,125,399 | 1/1915 | Rippin | 425/333 |
| 1,570,525 | 1/1926 | Rippin | 425/333 |
| 1,818,277 | 8/1931 | Schiff | 425/333 |
| 3,713,187 | 1/1973 | Quartarone et al. | 425/333 |

FOREIGN PATENT DOCUMENTS

| | | | |
|---|---|---|---|
| 2062098 | 6/1971 | France | 425/333 |
| 1071012 | 12/1959 | Germany | 425/332 |
| 1085471 | 7/1960 | Germany | 425/332 |
| 129130 | 7/1919 | United Kingdom | 425/332 |

*Primary Examiner*—Jay H. Woo
*Assistant Examiner*—Joseph Leyson
*Attorney, Agent, or Firm*—Wenderoth, Lind & Ponack

[57] ABSTRACT

A machine for rounding pieces of dough including a circular basin (10) on the inside of which is arranged a mobile component (21) having respective truncated conical circumferential surfaces (13, 24) which taper in opposite directions to form a concave annular cavity (V) for receiving a piece of dough (M). The respective conical surfaces are provided with grooves (131, 241). The mobile component (21) is rotatably driven while at the same time being cyclically shifted radially by activating device (15) so as to progressively round the dough pieces. A cover (C) is provided on the basin (10) and includes a feeding conduit (A), and a cylindrical band (32) which includes a projecting part (33) coinciding with a cutout (16) in annular wall (12) so as to form a discharge conduit (E) for processed pieces of dough (M).

7 Claims, 1 Drawing Sheet

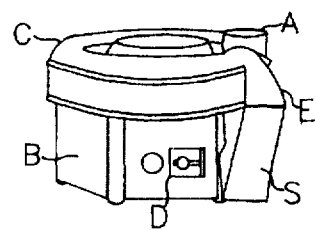
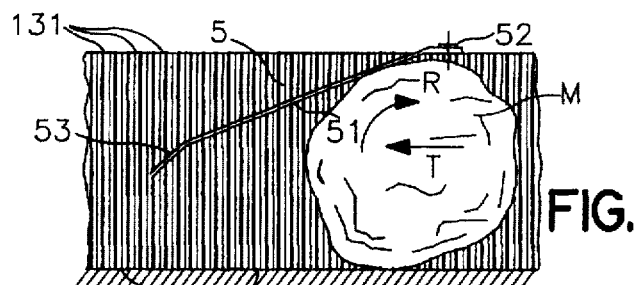
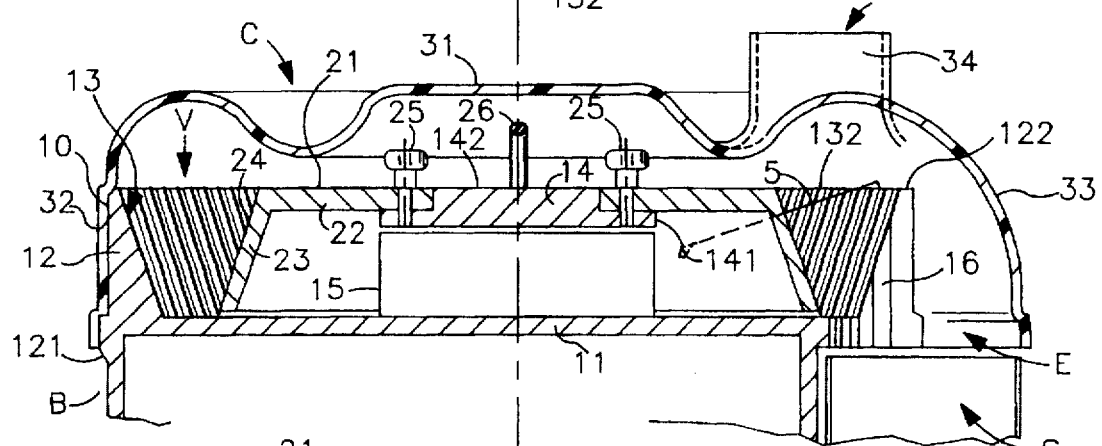
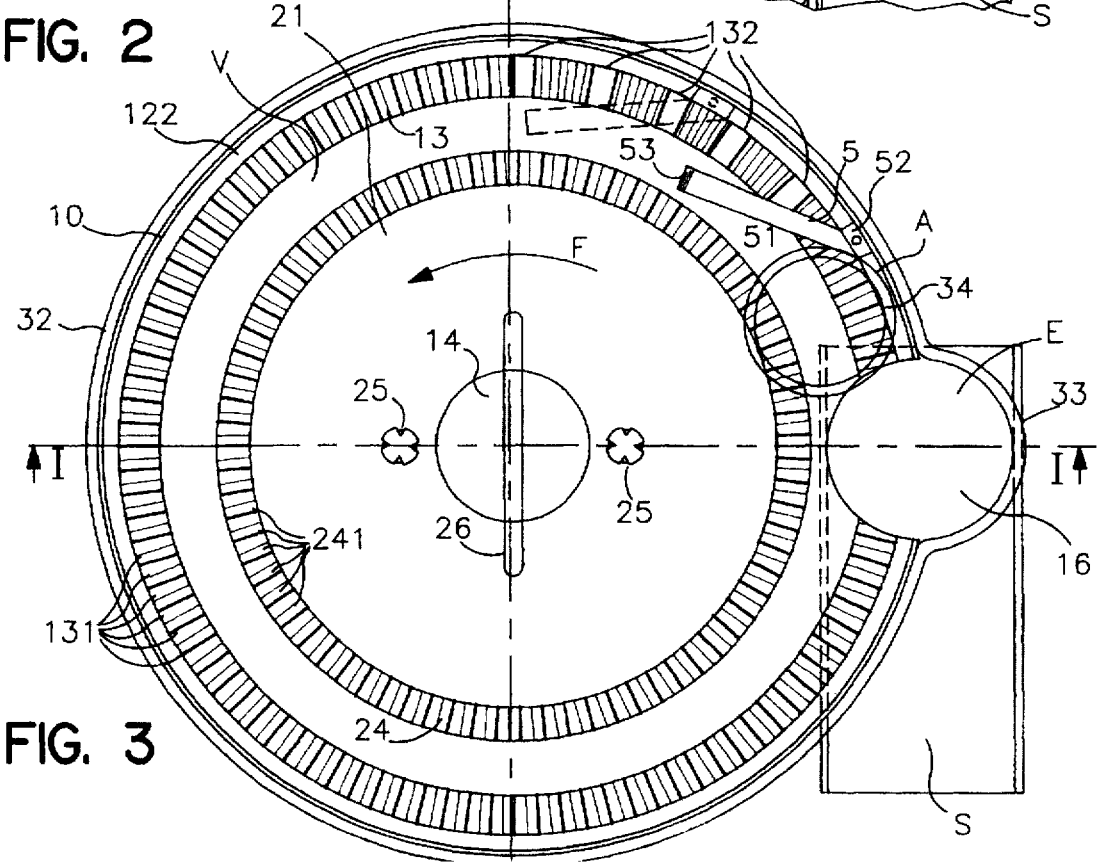

5,753,276

MACHINE FOR ROUNDING PIECES OF DOUGH

BACKGROUND OF THE INVENTION

The present invention covers a machine able to process pieces of dough of various irregular shapes and sizes coming from previous processed dough so as to confer upon them a final shape which is nearly spherical, and thus suitable for subsequent processing and related uses such as the production of pizza or bread.

Machines which perform such processing are known and have been in use for some time. The machines include a hollow space comprised basically of an annular cavity defined externally by a truncated conical walls converging toward the base of a basin and internally by a mobile body of a truncated conical shape converging toward the top. The mobile body is arranged in the bottom of the basin and is driven appropriately through suitable drive mechanisms to rotate coaxially with the latter, and at the same time undergoing with each rotation an appropriate number of radial alternating displacements.

There results from this a cycloidal rotating motion which causes the transformation of a piece of dough of irregular shape inserted at one point of the annular cavity such that at the end of one complete rotation of the latter, it reaches an appropriate final spheroidal shape and is sufficiently rounded so that it is discharged through an opening located upstream from the point of insertion.

The truncated conical surfaces, opposed to each other and reciprocally inverted converging toward the bottom of the external housing and from the internal mobile body, are normally both lined with a coating comprised of strips of a suitable fabric which is fairly wrinkled so as to develop a sufficient adherence against a piece of dough disposed in the annular cavity which causes it to be carried in the way described above for obtaining the final desired shape.

Such truncated conical bands of wrinkled fabric are attached so as not to be movable along on the corresponding truncated conical surfaces of the circumferential walls of the housing and of the mobile body. The bands of fabric tend to cause various interstices into which penetrate and progressively stick, particles of dough and/or flour. Over a period of time, the sticking clearly creates corresponding zones which turn out to form dangerous sources of bacterial contamination and development of various mycetes for which machines of this type clearly do not observe a minimum of the prescribed health standards.

The cleaning of such strips of wrinkled fabric cannot ensure a sufficient level of hygiene, especially since they are non-removable. Therefore such machines are practically hygienically unacceptable.

SUMMARY OF THE INVENTION

The purpose of the present invention is to obviate all of the above-identified such serious disadvantages of the prior art, as well as to markedly improve the processing of pieces of dough. These objects are obtained with a new machine which is the subject of the present invention. For a better understanding of the features and advantages obtainable with it, in one possible preferred form of implementation which is given only by way of example and is not to be taken in a limiting sense, will be described below with references to the enclosed drawings.

BRIEF DESCRIPTION OF THE DRAWINGS

FIG. 1 is a perspective view of an entire machine constructed in accordance with the present invention;

FIG. 2 is a cross sectional view taken along the line 1—1 of FIG. 3, the view illustrates a main part of the machine shown in FIG. 1 in which the processing of a piece of dough to be rounded is carried out;

FIG. 3 is a plan view of the apparatus illustrated in FIG. 2; and

FIG. 4 illustrates a particular application of the machine.

DETAILED DESCRIPTION OF THE INVENTION

In the figures the common details are designated with the same reference numerals and moreover in FIGS. 2 and 3 there is illustrated with continuous dark lines the only part which performs the processing of the dough while the cover is applied to it, the generic movement mechanisms are indicated with thin lines.

With reference first of all to FIG. 1, it is noted that the machine includes fundamentally a base B and a cover C. The base B is comprised of a housing suitably shaped and provided with suitable feet for supporting the housing on a work table. Control devices D are provided on a front portion of the housing, and the base B terminates at its upper part with a processing area. The pieces of dough are processed in the processing area in order to obtain the rounding, which however in this figure is not visible in its details, but which are instead clearly illustrated in FIG. 2 which will be described below. The cover C is comprised of a suitable housing of plastic material which includes a supply conduit A through which pieces of dough are introduced into the processing area, and an outlet conduit E from which the processed pieces of dough are discharged, and proceed to fall onto an inclined slide S so as to be conveyed to the processing table.

In FIGS. 2 and 3 there is illustrated clearly the area for processing the pieces of dough which as already mentioned are shown by the dark lines while the cover C which closes from the top is indicated with the lighter lines in order to permit a clearer view of the layout of the various parts.

With reference to FIGS. 2 and 3 it is noted how in the upper part of the base 3 there is hollowed out a circular basin 10 defined by a base comprised of a horizontal shelf 11 from which departs an annular wall 12 circumferentially extends so as to form a truncated conical internal surface 13 which converges toward the bottom.

On an upper part of the horizontal shelf 11 there is applied an appropriate activating device 15 (see FIG. 2) which includes a suitable electric motor and suitable movement machinery which is controlled by the motor to activate an associated mobile circular plate 14 arranged centrally as well as coaxially to the circular basin 10. The circular plate 14 is rotatable about the vertical axis of the circular basin 10 and moves alternately in radially opposite directions several times at each turn so as to develop a composite rotational-cycloidal movement.

As can be seen clearly from FIG. 2, the mobile circular plate 14 includes a lower part which for the reasons explained below has a greater diameter that its upper part 142.

Inside the above-described circular basin 10 there is arranged a mobile component 21 comprised of a truncated conical hollow body essentially in the shape of a bell. The component 21 is defined by a circular plate 22 from whose edge there runs circumferentially downward an annular wall 23 developing an external truncated conical surface 24 diverging toward the bottom.

The diameter of the lower end of the truncated conical part of the mobile component 21 will turn out to be distinctly less than the corresponding diameter of the lower end of the truncated conical part 13 of the annular wall 12 so as to permit the above-mentioned alternate radial displacement.

Clearly there results from this a concave annular cavity V in which the pieces of dough, inserted at one point are progressively brought by the rotational-cycloidal movement of the mobile component 21 along the course defined by the annular cavity V so as to undergo a series of composite rotational motions, which at the end of a complete revolution confer upon the dough the desired spheroidal shape.

As can be seen in particular from FIG. 3, the circular plate 22 of the mobile component 21 is provided centrally with a circular hole having a diameter equal to that of the upper part 142 of the mobile circular plate 14 such that the upper part 142 can be inserted in the circular hole to support the circular plate 22 on the lower part 141 which as mentioned has a greater diameter. The circular plate 22 is attached onto the mobile circular plate 14 thus attaching the related mobile body 21 through two knobs 25 in which threaded shanks penetrate first in holes formed in the circular plate 22 and are then engaged in corresponding threaded holes formed in the lower part 141. A suitable handle 26 will be applied to the upper part of the circular plate 22 which turns out to be suitable for permitting the application and/or the removal of the related mobile component 21 in a simple and convenient way. Finally, as can be seen in particular from FIG. 3, at a specified point of the concave annular cavity V there is an aperture resulting from a semicircular recess 16 which interrupts for a suitable stretch the annular wall 12 and extends for a discrete stretch into the horizontal shelf 11 where it permits, as described below, the processed dough pieces to exit.

The part of the machine described herein practically reproduces the operation of known similar machines and differs from all of the foregoing essentially by the fact that the truncated conical surfaces 13 and 24 are not lined with any strip of fabric or other material, but rather they are both provided with respective number of shallow straight grooves 131 and 241 extending equidistantly from their long axis coinciding with the respective conical generators. The shallow grooves 131 and 241 make it possible to obtain the same effect generated by the strips of wrinkled fabric used in the known machines and are each comprised of the longitudinal cavity with circular cross section with a radius of around 6 millimeters which penetrate into the related walls with a depth of only about 1.5 millimeters, developing related widths of around 5 millimeters and turn out to be separated from each other by an interval of about 10 millimeters. Obviously the shape and the size of the grooves may vary, for example, the grooves may have triangular, rectangular, or other cross sections which however must always have rounded edges or in any case blunt edges so as to permit access in all of their parts for cleaning operations. Moreover, in the upper part of the machine there is provided the application of a cover C which includes a circular upper wall 31 suitably shaped by the circumferential edge from which extends cylindrical band 32 which is engaged in a corresponding external cylindrical surface of the annular wall 12, being able to freely run along it until it draws with its lower border the flat band 121 projecting externally from the lower part of the same on which it is positioned in support. As can be seen from FIGS. 1, 2, and 3 a distance from the cylindrical band 32, it is made up with a radially projecting portion 33 which is connected suitably to the body of the cover itself and terminates at a lower end with a semicircular section which as clearly can be seen from FIG. 3, completes the above-alluded to semicircular opening 16 forming the outlet conduit E (see FIG. 1) for the discharge of the processed pieces of dough (M).

In the upper part 31 of the cover C there is moreover implemented, arranged in proximity of the protruding portion 33, as well as downstream from the latter with respect to the direction of rotation of the mobile component 21 indicated in FIG. 3 by the arrow F, a supply conduit A formed essentially by a cylindrical tubular segment 34 projecting vertically toward the outside of the upper part 31 and widening in a direction towards the underlying concave annular cavity V. The tubular segment 34 has a diameter that is sufficient to permit the passage of the pieces of dough to be processed and therefore their introduction into the annular cavity V.

It is known that providing only the shallow grooves 131 and 241, particularly for certain types of dough, does not permit the immediate start of the various composite movements which generate the processing of rounding of the pieces of dough. Various solutions have been attempted which have lead to the final solution which consists of simply providing on the truncated conical surface 13, along an initial stretch of the course of the piece of dough extending for about ⅓ or ½ of it, grooves 132 which are similar to but sufficiently wider than the shallow grooves 131, 241. The grooves 132 have, with respect to grooves 131, 241 a width of about three times greater and a depth of about double, and are separated from each other by a distance equal to about five time the spacing of the grooves 131, 241.

In the same stretch, still for improving the starting of the above-mentioned rotational movements induced on the pieces of the dough M, there is arranged as can be seen from FIGS. 2 and 3 and more detailed in FIG. 4, at least one or even more braking components 5 comprised essentially of a simple thin metal plate 51 with a width of about 1 centimeter. The plates 51 are fixedly attached at ends 52 to an upper circumferential edge 122 of annular wall 12 and penetrate in an appropriately inclined orientation into the inside of the annular cavity V. The plates 51 terminate with free ends 53 which are significantly curved downward and are positioned near the center of the cavity V.

As can be clearly seen in particular from FIG. 4, a piece of dough M, which passes through cavity V in the direction indicated by the arrow T, impacts against the metal plate 51 for generating a related friction and consequently braking the piece of dough, thereby inducing a subsequent advantageous rotational movement in the direction indicated by the arrow R. The aforementioned metal plate 51 is significantly elastic, and by the action of the thrust generated on the plate by the movement of the piece of dough M, the plate is deformed progressively upward so as to admit passage of the piece of dough.

In conclusion, there is below a synoptic description of the operation of the machine which is the subject of the present invention. A piece of dough M obtained from previous processing of dough and the like is introduced into feeder conduit A and falls into the underlying annular cavity V in which by the action produced by the grooves 241 of the mobile component 21 and by its rotational cycloidal movement jointly with that of the grooves 131 of the annular wall 12, the dough will advance while undergoing at the same time a number of composite rotational movements which progressively round the dough as it moves completely around the annular cavity V. At the end of a complete revolution, the dough is located at semicircular aperture 16 and it passes through the outlet conduit E form which it falls onto the underlying inclined shelf S reaching finally a suitable collection table.

From what has been explained above, it is obvious that there are notable advantages operationally and in the use of the machine in question, and such advantages are listed below.

In the first place, with such a machine one obtains a sure and maximum degree of hygiene. In fact, the respective truncated conical surfaces of the annular wall 12 of the circular basin 10 and the mobile component 21, the shallow grooves 131 and 241 always afford an easy accessibility which permits complete cleaning. Moreover, the removability of the entire internal mobile body 21 permits a perfect cleaning of the machine as well as access to all of the internal parts of the circular basin 10 thus also permitting cleaning of the latter.

All of the cleaning operations of all of the parts of the machine turn out to be very simple and can therefore be carried out easily and quickly. The cleaning operations can be performed frequently, such as at every interruption of the operating cycle without requiring the intervention of specialized personnel.

The application of the cover C turns out to be particularly advantageous because it makes it possible to obtain isolation of the dough processing area from the outside environment, thus preventing penetration in the former either during the processing or during period of non-use of the machine, of foreign substances or particles and thereby possible contamination of the dough as well as preventing the operator from accessing dangerous areas and thereby the cover represents an accident prevention measure.

In the truncated conical part 13 the initial segment of grooving 132 which is wider than the shallow grooving 131 and 241 as well as the application in the same segment of one or more braking components 5 substantially improves the processing of the pieces of dough M with a resultant improvement in the final product.

It will be noted finally that the machine in question has small dimensions and can therefore be used advantageously and simply on any work table or common table. Moreover, it may be applied to the underlying part of a kneading and dough cutting machine as for example that described in Italian Patent No. 01253370 by the present applicant, thus permitting the performance in a limited space of a complete group of processing operations which start with the dough and ends in obtaining of the final product, perfectly processed.

It is well understood that different variations may be applied to the present machine without however going outside of the scope of what has been described and what is claimed below with reference to the enclosed drawings and is therefore under the patent protection of the present patent.

I claim:

1. A dough processing machine for rounding pieces of dough, said machine comprising:
   a base including a horizontal wall, an annular projection having an annular conical surface extending upwardly and outwardly from a peripheral portion of said horizontal wall, and a plurality of grooves formed in said annular conical surface and extending longitudinally along a conical generator of said annular conical surface;
   an activating device mounted on a central portion of said horizontal wall of said base;
   an outwardly tapered truncated member rotatably mounted on said activating device, said truncated member having a horizontal plate, an annular conical portion extending downwardly and outwardly from a peripheral edge of said horizontal plate, and a plurality of grooves formed in an outer surface of said annular conical portion and extending longitudinally along a conical generator of said annular conical portion,
   wherein said annular conical surface of said base and said annular conical portion of said truncated member converge towards each other to define a concave annular processing course,
   an initial section of said annular processing course extends for approximately ¼ to ⅓ of the total processing course length, and
   a selected number of said grooves formed in said annular conical surface of said base, in said initial section, have a width and a depth which is greater than that of the other of said grooves formed in interior surfaces of said concave annular processing course;
   at least one elastically deformable braking component having a first end fixedly secured to an upper circumferential edge of said annular projection, said braking component extending from said upper circumferential edge of said annular member into said concave annular processing course; and
   a cover detachably mounted on said base.

2. The dough processing machine as claimed in claim 1, wherein said cover includes:
   a supply conduit defined by a cylindrical tubular segment disposed above said concave annular processing course; and
   a radially projecting portion which coincides with a semicircular cutout portion formed in said base.

3. The dough processing machine as claimed in claim 1, wherein said grooves formed in said outer surface of said annular conical portion and said grooves formed in said annular surface of said base, other than in said initial section, each have a width of approximately 5 mm and a depth of about 1.5 mm, and said grooves are equidistant from each other by a spacing of approximately 10 mm.

4. The dough processing machine as claimed in claim 1, wherein said grooves have a part-circular shape.

5. The dough processing machine as claimed in claim 1, wherein each of said selected number of grooves formed in said initial section has a width which is approximately three times and a depth which is about two times that of said grooves formed outside of said initial section, and said selected number of grooves are separated by a spacing which is equal to approximately five times the spacing of said grooves formed outside of said initial section.

6. The dough processing machine as claimed in claim 1, wherein said braking component comprises a flexible metal blade having a free second end which is significantly curved downward so as to be positioned at a central portion of said concave annular processing course.

7. The dough processing machine as claimed in claim 1, further comprising:
   a circular plate connected to said activating device;
   an annular shelf portion extending from a periphery of said circular plate;
   a handle secured to an upper surface of said circular plate, wherein said outwardly tapered truncated member is hollow and includes a central through hole formed in said horizontal plate for receiving a portion of said circular plate; and a plurality of fastening members for securing together said horizontal plate and said annular shelf portion.

* * * * *

UNITED STATES PATENT AND TRADEMARK OFFICE
CERTIFICATE OF CORRECTION

PATENT NO. : 5,753,276
DATED : May 19, 1998
INVENTOR(S) : Antonio CIMENTI

It is certified that error appears in the above-indentified patent and that said Letters Patent is hereby corrected as shown below:

On the cover page, in box [30] marked "Foreign Application Priority Data", please rewrite the data as follows:

--Oct. 30, 1995 [IT] Italy ...........PN95A000055--

Signed and Sealed this

Eighth Day of September, 1998

Attest:

BRUCE LEHMAN

Attesting Officer

Commissioner of Patents and Trademarks